United States Patent Office

Re. 27,264
Reissued Jan. 11, 1972

27,264

METHOD OF MAKING SPHERULES OF A CRYSTALLINE NUCLEAR FUEL CARBIDE

Harold G. Sowman, Maplewood, and James R. Johnson, White Bear Lake, Minn., assignors to Minnesota Mining and Manufacturing Company, St. Paul, Minn.

No Drawing. Original No. 3,163,609, dated Dec. 29, 1964, Ser. No. 256,238, Feb. 5, 1963, which is a division of Ser. No. 96,081, Mar. 16, 1961. Application for reissue Aug. 20, 1965, Ser. No. 484,785
Int. Cl. G21c *21/02*
U.S. Cl. 264—.5 27 Claims

Matter enclosed in heavy brackets [ ] appears in the original patent but forms no part of this reissue specification; matter printed in italics indicates the additions made by reissue.

*ABSTRACT OF THE DISCLOSURE*

*Method of producing nuclear carbide spherules wherein nuclear particles, of carbide or other composition, are heated in an isolating medium such as carbon to the fusion temperature to produce spherules. When starting with non-carbide particles enough carbon is included to form the carbide. The spherules are then given a pyrolytic carbon coating.*

This application is a division of our copending application Serial No. 96,081, filed Mar. 16, 1961, which issued as U.S. Patent No. 3,129,188 on April 14, 1964[.] *and which was a continuation-in-part of our copending application Ser. No. 838,445, filed Sept. 8, 1959, now abandoned.*

This invention relates to spherules of refractory carbides and more particularly to spherules of boron, thorium and uranium carbides and processes for the production thereof.

It is known that when it is desired to design a nuclear reactor of large size relative to the critical mass, it is necessary to provide a means of controlling the neutron flux so that the reactor is not self-destructive. Thus, it is necessary to incorporate into the reactor materials capable of absorbing and dissipating excess neutrons. It is particularly desirable to incorporate as such materials substances which become less efficient in absorption and dissipation of excess neutrons as operation of the reactor proceeds, since the accumulation of fissioned materials normally lowers the efficiency of the system progressively, until such point as a self-sustaining reaction is no longer possible. Effectively removing the neutron absorbing materials during the life of such a reactor permits longer operation of the system before chemical reprocessing of the fuel elements is required.

An especially efficient way of accomplishing the controlled but progressive effective removal of neutron absorbers from atomic reactor systems is by the use of destructible or burnable poisons in the reactor core. By the term destructible or burnable poisons is meant substances capable of absorbing neutrons, and which are thereby converted to non-absorptive atoms. For example, boron as such or in the form of boron carbide is converted to helium or lithium which are no longer effective neutron absorbers. To use boron carbide effectively for this purpose, it should be distributed relatively homogeneously in the core or that part of the core in which it is desired to burn poison and fuel simultaneously. The poison may be incorporated with the fuel or as a separate element. Particles of these substances can be incorporated in a metal shell at a desired concentration to give the effective absorption capacity desired, for example, by thorough mixing with metallic powders and following the technology of powder metallurgy to produce an intermediate compressed shape which is sintered to give a final configuration. However, the use of ordinary particles of irregular shape but of reasonably uniform individual size has been found to suffer from the disadvantage that during working of the metal further fragmentation takes place, with the production of defects which permit diffusion of the helium produced by neutron capture, or an accumulation of the gas may even result in a rupture of the metal container. Furthermore, if the metallic elements containing the burnable poison are mechanically worked in any way following their shaping by sintering, the irregular particles break up and string out, thus causing internal porosity permitting rapid transfer of fissioned gases or particles along the line of the defect. Spherical particles would greatly reduce these disadvantageous results.

A further problem in the production of atomic reactors is that of providing reactor fuel elements containing uranium carbide as fissionable material, in which the said fissionable material is dispersed in small particles throughout a pellet or matrix. Desirably, the particles are of substantially uniform size and shape in order to give the best possible results when incorporated into metallic matrices or employed in packed containers. While uranium carbide may of course be reduced by grinding or ball milling to particles of extremely small and fairly uniform size, although these may be of irregular shape, it is advantageous to provide particles which are predictably regular. Spherical particles are by far the most desirable in this connection. Furthermore, because of the pyrophoric nature of uranium carbide, minimization of the surface area by the provision of spherular particles is also very advantageous.

Fuel elements containing thorium carbide in combination with uranium carbide are useful for certain types of reactors. This combination *of nuclear fuel carbides* appears to exist in the form of solid solutions in which the proportion of carbon is constant and the thorium-uranium ratio may vary but together they are stoichiometrically equivalent to the carbon. Compositions of this solid solution series are herein referred to a uranium (thorium) carbide.

It is an object of this invention to provide small substantially spherical solid particles of crystalline boron carbide, uranium carbide and uranium (thorium) carbide structures.

It is another object of this invention to provide a process for the production of substantially spherical particles of high-melting carbides.

Still another object of the invention is to provide spherical particles which have surface coatings.

Other objects of the invention will become evident from the disclosures hereinafter made.

In accordance with the above and other objects of the invention, it has been found that solid spherules of boron carbide and uranium (thorium) carbide can be formed by rapidly melting discrete particles of these substances in admixture with a resilient inert isolating material of low bulk density such as amorphous carbon, graphite, boron nitride, and the like to form small molten spheres, and then cooling the mixture to solidify the carbides in spherical shape. The essential step appears to be that of maintaining the discrete, isolated particles of boron carbide or uranium (thorium) carbide in molten form for a time just sufficient to form spherules by operation of surface tension on the molten particle.

The uranium (thorium) carbide spherules according to the invention have the average composition $U_nTh_mC_2$ where m and n are numbers from 0 to 1 and the sum of m and n is 1. For such compositions there appears to be a progressive series of solid solutions of increasing melting point from $UC_2$ through $U_{0.5}Th_{0.5}C_2$ to $ThC_2$. preferably, m is less than 1 and greater than zero.

By the term "spherules" as used herein, it is intended to designate substantially spherical structures having a diameter in the range of about 10 microns up to about 125 mils, having a glossy surface formed from the molten or at least semi-molten state by the operation of surface tension, while the interior of the said spherules has a crystalline structure characteristic of the particular carbide system and is substantially free from voids. In some instances, the spherules when viewed under magnification appear to have a surface consisting of minute facets. The presence of such minute surfaces of different radius of curvature is immaterial when the particle as a whole is substantially spherical. The spherules exhibit the property of rolling on slight inclines which is characteristic of spheres.

Surprisingly, while the spherules produced in the process of the invention are crystalline as shown by X-ray diffraction studies, the surfaces of the spherules are uniformly smooth and substantially spherical, presenting a highly polished appearance when inspected under the microscope at moderate powers of magnification. The particles are furthermore solid, by which is meant that they are substantially free from voids. If particles of uniform size are used as starting materials, the resulting spherules are also of substantially uniform diameter. However, the starting material may contain a wide range of sizes, and the final product will in that case also have a wide variation in diameter. The spherules can of course be graded as to size by the use of appropriate sieves.

While it has heretofore been known to produce small beads from glass or vitreous materials, so far as is known the art has not heretofore been aware of any way in which spherules of hard crystalline substances, such as boron carbide, can be made. It is highly unexpected to find that crystalline spherules of hard crystalline substances, such as boron carbide, can be made. It is highly unexpected to find that crystalline spherules of boron carbide and uranium (thorium) carbide can in fact be produced without domination of the surface by crystal faces. Aside from the fact that spherules are formed from crystalline chemical compounds as opposed to vitreous substances by the process of the invention, it is also rather surprising to find that spherules of boron carbide are formed at all when carbon is used as an isolating medium, since it has been found that molten boron carbide wets carbon surfaces and it might be expected that when fused it would interpenetrate the graphite or carbon particles employed as an isolating medium or dissolve so much carbon as to form merely a boron carbide having high carbon content. Without being bound thereby, it may be hypothesized that the formation of spherules may result from a blanketing effect of the resilient or yielding finely divided carbon or other non-reactive low bulk density isolating media employed. When coarse isolating powders are used, of the order of particle size of the material which is to be made spherical, satisfactory spherules are not usually formed.

It is found that the carbon content of boron carbide spherules commonly increases slightly over that of the original particles on spheroidization by the process of the invention. This may be caused by solution of some of the carbon in direct contact with the molten boron carbide over a relatively larger area or along a particular crystal axis. The resulting spherules usually contain boron and carbon in a ratio of from about 3 to about 6 atoms of boron per atom of carbon. It is known that boron carbides exist thus in a number of phases. The phases which may be present can be determined by reference to the phase diagram of boron and carbon shown in Zhurnal Fizicheskoi Khimii, vol. 32, pp. 24–28, October 1958.

Broadly speaking, the process of the invention is carried out by isolating small irregularly shaped discrete particles of a source of uranium carbide, uranium (thorium) carbide or boron carbide by mixing them with an isolating medium of low bulk density, placing the mixture in a suitable furnace in the presence of a non-reactive atmosphere, rapidly heating the mixture to a temperature sufficient to form spherules owing to the surface tension forces acting on the molten or semi-molten carbide, cooling the mixture, and removing the isolating material from the spherules.

The isolating medium used can be any substance not inter-reactive with the carbides, which is of low bulk density, and which is not melted at, nor otherwise physically changed, at the temperatures used in the process. Examples of such materials are carbon and boron nitride in finely divided form.

Various compounds of uranium and boron, such as oxides, and the elements themselves may be employed as equivalents of the carbides, in that they form the respective carbides at the temperatures used, when carbon is employed as the isolating medium or in conjunction therewith. Furthermore, the corresponding compounds of thorium may be used with uranium compounds in any desired proportions, or in place thereof to furnish uranium (thorium) carbide. Thus, sources of the uranium (thorium) and boron carbide (*carbide-forming materials*) *containing the metal of the carbide to be formed* from which the *nuclear fuel carbide or poison carbide* spherules of the present invention are produced are uranium (thorium) carbides and boron carbide [therselves] *themselves,* or, if carbon is employed, the metals, their oxides and the like. It is possible that the reaction with carbon, *which may be termed carburizing,* which takes place when a source other than the final carbide is used as a starting material occurs more or less simultaneously with the spheroidization, and at a lower temperature than the melting point of the particular carbide. Without wishing to be bound by theory, it is possible that in some cases spherules of lower melting materials, such as boric oxide, are first formed, followed by rapid reaction with the carbon to form the carbide. However, it is considered that this process is fully equivalent to the process in which the carbide actually exists in molten form.

It will be apparent that if a precursor for the uranium carbide, uranium (thorium) carbide, or boron carbide is used, such as the metals or their oxides, it will be necessary to provide at least sufficient carbon in the isolating mixture to react with the precursor in addition to the amount of isolant necessary to effect isolation of the particles.

While reference is made herein to boron "metal," it is of course apparent that boron is not a true metal in the generally accepted sense of the word, and it is to be understood that the term "metal" in this connection is used for convenience only as designating the element.

To avoid oxidation, it is preferred to heat the mixture in a non-reactive atmosphere, meaning by the term atmospheres which do not react with any of the components of the mixture which is heated. It is known that nitrogen may react with boron at the temperature employed in the process to form boron nitride, which may in some instances be undesirable.

It is a rather surprising feature of the process that reaction to form spherules of carbides from sources other than uranium (thorium) or boron carbides, e.g. the metals or oxides, proceeds so rapidly as to be virtually complete in the relatively short time intervals employed. This is particularly striking because as suggested above, reaction may be taking place with spherular particles of the precursor which then present a minimum surface for reaction.

While other finely divided isolating media may be employed, carbon powder is conveniently available and is used herein to exemplify isolating media in general as to the amounts and state of division which can be used. The carbon powder which is used need not be chemically pure carbon, but as used herein the term "carbon" is employed in the common technical sense and includes graphite, carbon black, lamp black, amorphous carbon, petroleum coke and the like low bulk density forms of carbon. Preferably, the particle size of the powdered carbon or other isolating particles which is employed is at least about one order of magnitude smaller than that of the material to be converted to spherules, so that there are a large number of carbon particles for each of the particles of carbide which is to be produced as a spherule. *In this way the particles to be spheroidized are kept out of physical contact with each other.* The effect is to provide a yielding, or resilient, supporting medium for the spherules as they form. Various forms of finely divided carbon and the particle sizes thereof are described in "Industrial Carbon," Mantell, D. Van Nostrand Co., Inc., New York, 2nd ed., 1946.

Generally speaking, the [production] *proportion* of isolant to the carbide or carbide precursor which is employed in the initial mixture may be [carried] *varied* over a wide range in carrying out the invention. Thus, 100 parts by weight of isolant can be used for each 1 to 100 parts of starting material, although it should be understood that proportions outside of this range can also be used. While an unduly high proportion of carbon powder results in somewhat less economical operation, in that the heating of a relatively large mass of material is required before fusion of the carbide particles takes place, this does not prevent formation of spherules. On the other hand, too small a proportion of carbon prevents the mechanical separating action to the degree which is necessary to obtain good spheres and apparently also affects the resiliency adversely. It will be apparent that when a precursor substance is used which forms the selected carbide on heating with *carbon*, the amount of carbon is increased to compensate for the carbon which is consumed in the reaction, or an amount of carbon must be added to the reation mixture, as the carbon must serve as a carbon source for the chemical reaction to form the carbide. Preferably, a ratio of about 5 to 20 parts of carbon by weight to 1 part by weight of carbide or carbide precursor is employed, as providing better size control for the spherules.

The spherules can be made by a batch process. In this case, after thorough mixing, to insure that the finely divided mixture of isolating medium and source of carbide is substantially homogeneous, it is placed in a suitable refractory container in a furnace, in an inert (non-reactive) atmosphere, and heated rapidly to a temperature in the range of about 2300 to 2700° C. As non-reactive atmospheres, argon, helium and the like may be mentioned as suitable, while nitrogen can be used but is somewhat less satisfactory owing to the possibility of the formation of nitrides. The chief function of the non-reactive atmosphere is to prevent the combustion of the carbon which would otherwise take place in the presence of oxygen at the temperatures employed, but the atmosphere used must not react with the carbide source or with the isolating medium. The temperature to be employed is that which is just sufficient to melt the particular carbide which is selected, so that the force of surface tension can draw each particle of the carbide into a spherical shape. The melting point of boron carbide is about 2450° C. while that of uranium carbide is about 2350° C. and of thorium carbide about 2650° C. Although temperatures somewhat in excess of these temperatures can be employed, they are not necessary for successful formation of the spherules and may result in some coalescing of the spherules to form larger spherules. While this may not be undesirable in some instances, it will be apparent that control of the diameter of the spherules will then be more difficult.

Temperatures of the order required in the process, i.e. above about 2000° C., are determined optically and therefore are not exact temperatures. Some variation in observed temperature from batch to batch may consequently be expected, as well as differences arising from personal visual errors.

The heating of the mixture is continued only for so long as is necessary to produce the spherules. The dwell time in the furnace, i.e. the length of time required to form spherules, is readily determined by empirical methods and depends on the mass of material being heated and the capacity of the furnace. The mass is kept in the furnace just slightly longer than required for the entire mass to reach the melting point of the carbide, which is just sufficient to bring about transformation of the carbide particles to spherules. The mixture is then rapidly cooled to a temperature below the melting point of the particular carbide involved, for example, by removal of the mixture, while maintaining the non-reactive atmosphere, *from the reaction zone* to a zone in which positive cooling is accomplished. The rate of cooling is advantageously made high in the case of uranium (thorium) carbide in order to produce and maintain the fine crystalline structure of the dicarbide since under slow rates of cooling and in annealing there is some tendency for recrystallization with the formation of (U, Th)C and carbon. The effect is observed, for example, in etched metallographic specimens which show fine striae after annealing which are lacking in quenched spherules. Furthermore, there are differences in the unit cell dimensions as determined by X-ray diffraction techniques which indicate that the quenched material is more dense. After cooling, the spherules are separated from the remainder of the mixture, for example, by washing, screening, flotation techniques and the like.

Alternatively, a rotary kiln may be used for continuous larger volume commercial production bearing in mind the absolute necessity of avoiding critical masses. In this case, the mixture of isolant and starting materials is fed continuously into the upper end of a rotary kiln which slopes downwardly from inlet to outlet. The inlet end of the kiln is heated by any convenient means to a temperature in the appropriate range and as the mixture progresses it rapidly becomes heated to cause formation of spherules. A non-reactive atmosphere is provided in the kiln. The kiln may be provided with a positively cooled zone, or the mixture may be discharged into a stream of cold inert gas and allowed to fall into a receptacle. The scope of the kiln is adjusted to provide the proper dwell time for the temperature and heating unit employed. The use of a rotary kiln is less desirable since larger spherules are formed by agglomeration and size control is therefore more difficult.

In another method which can be used for making the spherules of the invention, a bed of the selected isolating medium is spread upon a refractory pallet, such as a graphite block of appropriate dimensions. The isolating medium can be present in a relatively thin layer, as for example about 10 to 100 mils in thickness. The finely divided uranium or boron carbide is then sprinkled on this bed in a layer approximately one particle thick, and subjected to intense heat in a non-reactive atmosphere until the carbide particles are drawn into spherules. The pallet is thereupon removed from the heating zone and cooled.

It is commonly found that the isolating medium adheres to some extent to the surfaces of the spherules, particularly when carbon is employed. Preferably, the spherules are treated with a bath containing a detergent, to remove the carbon or other materials as completely as possible from their surfaces. However, where carbon is used, it will be apparent that for some applications it will not be necessary to remove the adherent carbon as completely as for others. If desired, substantially all of the carbon which may be adherent to the surface can be removed therefrom by oxidation under controlled conditions, as for example, by refluxing the particles with chromic acid solution, or by heating them in air at about 1000° C., in the case of boron carbide. For removal of particles of isolating material from uranium carbide spherules, if required, milling in a ball mill with an organic solvent such as acetone, and with rubber-covered steel balls, removes the adherent material.

Cleaning of the spherules of the invention is also usefully accomplished by employing ultrasonic vibrating devices. The process comprises suspending the spherules in an inert liquid having a viscosity no greater than that of water, preferably containing a small amount of surfactant, and subjecting the suspension to ultrasonic vibrations for about 3 to 5 minutes. The liquid is decanted and replaced with fresh liquid repeatedly until suspended carbon is no longer evident therein. Uranium (thorium) carbide spherules are cleaned by this procedure using non-hydroxylated solvents since reaction with hydroxylated solvents such as water may result in oxidation of the surfaces. Boron carbide is cleaned in the same manner, but water can be used.

Having thus described the invention in broad general terms it is now more specifically illustrated by examples which show the best mode contemplated of practicing the invention. In these examples all parts are by weight unless otherwise specified.

Example 1

A mixture of powdered boron carbide and graphite is prepared by mixing 6.75 parts of boron carbide of −140 to +325 mesh and 33.75 parts of finely divided carbon (a furnace black or "Thermatomic" carbon), in a one pint glass jar in which are placed coiled iron wires. Mixing is effected by rolling the jar on rollers of the type used for laboratory ball mills for 10 minutes at about 112 r.p.m. The mixture is separated from the wires avoiding manipulation which might cause separation of the solid ingredients and the mixture is packed loosely in a carbon tube of suitable size loosely fitted at both ends with threaded graphite plugs. This is referred to as a boat.

The boat containing the batch is placed at the entrance of a carbon tube furnace about 3 feet long and 3 inches in diameter approximately the central one-third portion of which is heated to a temperature of 2500° C. by passage of an electric current therethrough (resistance heating). Temperatures are determined optically. The furnace is flushed with argon to provide *a substantially oxygen-free environment, i.e.,* a non-oxidizing atmosphere and to prevent oxidation of the carbon tube. Enough of the argon enters the boat to leave an inert atmosphere in the boat without special measures. After the boat has attained a bright red heat (about 700° C.) at the front of the furnace (about 2–3 minutes) it is moved into the central region of the furnace, held at 2500° C. and left there for about 8 minutes. When first moved to this region there is a drop in temperature of the furnace, which is quickly restored and the boat attains the said temperature in about 3–5 minutes. The actual time required depends on the particular dimensions of the system. The slightly longer residence time of 8 minutes permits the boron carbide to melt and form molten spherules in the graphite matrix. The boat is then moved to the water cooled cold end of the furnace and permitted to cool rapidly to below a red heat (about 600° C.). This requires about 5 minutes. The boat is then removed from the furnace and one plug removed.

When cooled sufficiently that the batch inside no longer appears to glow, the batch is poured into a large volume of dilute solution of a detergent such as an alkyl ether of polyethylene glycol (available commercially under the trademark "Tergitol" from Union Carbide and Carbon Corporation). The suspension is stirred to permit wetting of the particles of carbon and spherules of boron carbide and poured through a 325 mesh wire screen. The residue is washed repeatedly with clear water and fresh detergent solution until the wash water no longer shows observable discoloration due to carbon. The batch is then dried and found to weigh slightly more than the boron carbide used due to a pickup of carbon partly as free occluded carbon and partly as carbon dissolved in the boron carbide. The spherules vary in diameter from about 50 to 200 microns, and are separated from a few percent of malformed particles by rolling down an inclined plane or other method. Screening serves to classify the spherules in various diameters if desired. Analysis for boron and carbon shows:

| | Percent |
|---|---|
| Total B | 67.74 |
| Total C | 34.23 |
| Free C | 12.09 |

The values for total B and C are presumably both slightly high. The atomic ratio of boron to combined carbon is about 3.4:1 to about 3.5:1. The spherules show the characteristic X-ray diffraction patterns of boron carbide. These spherules are hard and smooth and are suited for incorporation in the reactor designs as a burnable poison. Reference to the above-cited phase diagram shows that this composition (24.6 percent C combined) corresponds to the $\beta'$ phase.

Example 2

When the preceding procedure is repeated, except that boron is used instead of the boron carbide, operating at a furnace temperature of about 2350° C. to about 2500° C., spherules of boron carbide are obtained. When the boron used as a starting material is of particle size −140 to +325 mesh, the spherules obtained are approximately 40 to 200 microns in diameter.

Example 3

The procedure of Example 1 is repeated, except that boron-rich boron carbide, corresponding to $B_{4.5}C$ and having a particle size of about −100 to +400 mesh, is employed. A furnace temperature of about 2500° C. is used. Spherules of boron carbide, having the formula $B_{3.4-3.5}C$ and about 37 to 150 microns in diameter, are obtained.

This procedure is repeated, except that boron-rich boron carbide corresponding to the formula $B_6C$ and having a particle size of −100 to +400 mesh is employed. The temperature used is the same as that used for the $B_{4.5}C$ particles.

Spherules of boron carbide corresponding to the approximate formula $B_{3.4}C$—$B_{3.5}C$, and having a diameter ranging from about 37 to 150 microns, are thus obtained.

Example 4

The procedure of Example 1 is repeated, except that 7 parts of powdered boric acid are used. The furnace temperature employed is about 2500° C. The dwell time in the furnace is about 10 minutes at furnace temperature. Spherules of boron carbide, as shown by characteristic X-ray diffraction patterns, are obtained, having a range of diameters from 10 microns up to about 200 microns. The smaller spherules, having diameters ranging from about 10 to 30 microns, can be separated from the carbon in the wash water by sedimentation and decantation.

Substantially the same results are obtained when 7 parts of −100 mesh boric oxide ($B_2O_3$) are substituted for the boric acid which ie employed above. In this case, a furnace temperature of about 2450° C. is used, and spherules of boron carbide having a diameter range of from about 50 to 200 microns are obtained. The spherules are shown to be boron carbide by their characteristic X-ray diffraction patterns.

Example 5

The procedure of Example 1 is repeated, except that 13.5 parts of carbon are used. Spherules of boron carbide having an approximate diameter ranging from 50 microns to 200 microns are obtained, while an amount of the boron carbide agglomerates to larger diameters. Similarly, when the procedure of Example 1 is repeated, except that 67.5 parts of carbon are used, spherules having the same diameter range are obtained. The use of 337.5 parts of carbon for isolating 6.75 parts of boron carbide likewise gives useful spherules, but the heating of this large mass of low bulk density requires an increase in dwell time in the furnace and the separation of the spherules from the carbon becomes somewhat more difficult. The change in the proportions of carbon employed does not substantially affect the amount of carbon which is found upon the surfaces of the spherules.

Example 6

A larger batch of spherular crystalline boron carbide is prepared in a series of smaller batches as follows: Powdered boron carbide of the approximate formula $B_4C$ consisting of about 30 percent by weight of discrete particles of less than 100 mesh and more than 200 mesh and the balance of discrete particles between 200 and 270 mesh is carefully blended with ten parts by weight of finely divided carbon (furnace black, available under the trademark "Thermax") in a twin-shell blender with an intensifier bar for five minutes. Portions of the blended mixture weighing approximately 110 grams are placed in cylindrical graphite boats 11 inches long and 4 inches outside diameter with ⅛ inch thick walls and the boats are then successively placed in a tube furnace in a flowing argon atmosphere at 2500° C. for ten minutes and then moved forward to a cooling zone to cool to around 600° C. Thereafter, the mixture is cooled to a convenient handling temperature and the contents of the several boats are screened to remove carbon as above by washing with water containing a wetting agent and dried. Rough classification to remove substantially non-spherular particles provides 113 grams of substantially spherular crystalline boron carbide. Sieve analysis shows that about half of the material is in the range of about 35 to 50 microns in diameter mesh and most of the rest is in the range of about 50 to 150 microns in diameter. Some of the spherules fail to pass a 70 mesh screen and approach 125 mils in diameter. The finer material contains an excess of carbon, probably unremoved isolating carbon.

Example 7

Ten parts of boron nitride of −325 mesh size (substantially all of the particles being about 10 microns in diameter) and 1 part of boron carbide ($B_4C$) of about −100 to +270 mesh size are carefully mixed to insure that the boron carbide particles are uniformly distributed throughout the mixture. The mixture is then loosely packed into a graphite boat which is approximately 2¾" in diameter and 7" long, and with wall thickness of about ¼". The ends are loosely plugged with graphite discs. The boat is placed in the entrance of a carbon tube furnace as described in Example 1. The furnace is flushed with argon and the argon atmosphere is maintained throughout the heating and cooling operations. After the boat has attained a bright red heat, it is moved to the 2500° C. zone of the furnace and held there for about eight minutes. At this time the entire mass has become heated to a temperature sufficient to melt the boron carbide particles and form spherules. The boat is then moved to the water-cooled cold end of the furnace and permitted to cool rapidly. When it is no longer at red heat it is removed from the funace and cooled until it can be handled conveniently. The boat is opened and the spherules which are formed are separated by washing the boron nitride from the spherules, using copious quantities of a dilute aqueous detergent solution, followed with distilled water.

Spherules of $B_4C$ ranging in diameter from about 60 to 150 microns are thus obtained.

Example 8

The procedure of Example 1 is repeated employing 1 part of uranium carbide about −70 to +150 mesh in place of the boron carbide, with about 3 parts by weight of thermatomic carbon. Because of the pyrophoric nature of uranium carbide it must be handled cautiously. The batch is heated for 10 minutes at 2350° C. after first permitting it to heat at 1000° C. for 4 minutes. The spherular uranium carbide is isolated from the batch after cooling as above by quickly washing the batch through a sieve which passes the carbon particles using water containing a small amount of detergent. Spherules of uranium carbide about 100–200 microns in diameter are obtained. While water can be used for separating the spherules from the isolating medium when small batches are processed, non-hydroxylated organic solvents, such as benzene, are preferred for use in processing large amounts of uranium carbide spherules to avoid the danger of decomposition. The spherules are dried in an argon atmosphere. The dry uranium carbide spherules are suitable for dispersion-type reactor fuel elements. The carbon content of the compound, in spherular form, is reduced from $UC_2$ to predominantly UC by heating in dry hydrogen for 1 hour at 1300° C. This material is extremely pyrophoric and must be handled with care, under an inert atmosphere.

When powdered boron nitride is employed as an isolating medium for producing uranium carbide spherules, there is a possibility of contamination of the resulting spherules of uranium carbide, as with boron. Consequently, when uranium carbide spherules of high purity are required, the isolating medium of choice is finely divided carbon.

When 7.5 parts of uranium dioxide, about −100 to +200 mesh particle size, are carefully blended with 22.5 parts of carbon black as in Example 1, and then heated in an argon atmosphere to 1000° C. for 4 minutes, followed by 10 minutes at 2350–2360° C., uranium carbide spherules are formed having diameters in the range of about 50 to 150 microns. These are separated from the isolating medium as before stated.

The preceding procedure is repeated, but using 7.5 parts of uranium dioxide of about −100 to +200 mesh particle size, and 37.5 parts of finely divided carbon black and the batch, in an argon atmosphere, is kept at 1000° C. for 4 minutes and then maintained at about 2300–2375° C. for about 10 minutes. The batch is cooled and the spherules are separated as before. Uranium carbide spherules ranging from about 50 to 150 microns in diameter are obtained.

It is found that spherules are formed as above when the soaking, i.e. time of maintaining maximum temperature, is as short as ten minutes. It is somewhat advantageous to permit soaking to proceed for about 20 to 30 minutes in that there is better opportunity for spheroidization to proceed with better elimination of microscopic inclusions and voids. An annealing at a lower temperature, e.g. 2200° C., for two hours also serves to perfect the shape and density of the spherules.

When uranium dioxide is employed as the starting material it is advantageous to assure proper reaction by first mixing the uranium dioxide intimately with about 2.0 to 4.0 moles of carbon per mole of uranium dioxide and a small amount of an organic binder. A mixture of 100 parts of $UO_2$ (less than 50 micron size), 9 parts of fine carbon and 4 parts of polyvinyl alcohol is ball milled for 2 hours to a homogeneous mixture. The dark gray mixture is dried and granulated to a size of about 250 to 350 microns and the granulated material is blended with an approximately equal weight of thermatomic carbon and spherulized as above by heating to 2525° C. for 30 minutes. The mixture is cooled, separated from the bulk of the supporting carbon by ultrasonic washing with benzene or isooctane with frequent decantation of the supernatant liquid and addition of fresh solvent. The cleaned particles no longer make a smudge when rubbed on uncalendered paper and are approximately 150 to 250 microns in diameter. Metallographic examination of the spherules in section shows good crystalline structure and substantially circular outlines.

For certain nuclear reactor uses it is desirable that the spherules of uranium carbide or uranium (thorium) carbide or the oxides, be sheathed with a tough cladding which is substantially impervious to fission products and yet non-absorptive of neutrons. Such coatings can be provided by plating the spherules with metals, by coating with appropriate ceramic powders together with a binder followed by firing, by decomposition of gases to deposit hard carbon on the spherules, or the like.

It is found that a particularly useful coating is provided by a layer of carbon deposited by pyrolysis of a hydrocarbon under certain conditions. Since the layer of pyrolytic carbon thus produced shows properties different from those of graphite or ordinary soft carbon it is convenient to refer to it by a distinctive term and it is herein termed pyrocarbon.

It is known that pyrocarbon coatings can be applied to relatively large articles, such as ceramic tubes and the like. However, the problem of applying a pyrocarbon coating to the spherules of the invention is rather more difficult than the coating of tubular ceramic bodies since sequential mechanical movement and exposure as used heretofore is entirely unfeasible with such small objects. It has furthermore been found that somewhat higher temperatures are operative. This may be associated with a failure of the smooth substantially spherical surfaces of the spherules of the invention to provide any catalytic effect on the decomposition of the methane employed as a source of carbon, as compared with articles such as ceramic tubes which presumably have a rough and grainy surface.

It is found that pyrocarbon is deposited on the spherules as a tough coating by the pyrolysis of methane, carbon monoxide or the like at a temperature of about 1300° to 1700° C. Preferably a temperature in the range of about 1300° C. to 1450° C. is used. While some deposition of pyrocarbon occurs on static spherules, the preferred procedure is to maintain the spherules in motion to achieve a more uniform coating on each spherule. This is achieved by slowly dropping the spherules through a heated zone, by vibrating a suitable receptacle containing the spherules in a heated zone, by tumbling the spherules by rotation of the heated zone, or by fluidizing a bed of the spherules using an inert gas, for example, helium, at the temperatures noted above.

Example 9

About 50 grams of spherules of $UC_2$ (about 200 to 250 microns in diameter) prepared as described in the first part of Example 8 above are placed in a rotating graphite drum about 3 inches in diameter and 4 inches long having gas inlet and outlet connections rotatably mounted in a 3½ inch diameter quartz tube. A coil surrounding the tube is couped with a 15 kw. 10 kc. generator so that the crucible is heated by induction. A stream of argon containing 10 percent by volume of methane is passed through the tube to displace air and the crucible and contents are heated to about 1300° to 1350° C. (determined by an optical pyrometer). Heating and rotation of the crucible are continued for about 1 hour and the flow of methane is cut off and the crucible allowed to cool in the stream of argon. It is removed and the spherules are found to be coated with a tough hard layer of pyrocarbon about 30 microns thick.

Example 10

A mixture of 1 part of granules of pressed uranium oxide and carbon in 9:1 ratio and about 300 micron diameter and 2 parts by weight of "Thermatomic" carbon (finely divided, furnace black) is made by placing the ingredients in a twin shell blender and mixing thoroughly. A batch of desired amounts is packed loosely in a carbon tube ("boat") which is loosely fitted at both ends with threaded graphite plugs and which is of suitable size to fit into the furnace used. The tube with the batch is permitted to heat at 1000° C. for four minutes. It is then moved to the central zone and there heated (fired) at 2550° C. Heating at this temperature for about 30 minutes produces substantially void-free spherules. After firing the batch-containing tube is moved to the end of the furnace, which is cooled with water and permitted to cool rapidly to below red heat. About five minutes are required for this cooling, whereupon the tube is removed from the furnace, one plug removed and the batch is poured into an argon allutriation separator in which the finely divided carbon is blown away from the larger spherules of uranium carbide with argon, in a continuous winnowing operation, and the spherules are very rapidly cooled. In this operation, nitrogen can also be employed as the inert gas, a conical vessel fitted for introduction of gas at the small lower end is provided with a foraminous (gas permeable) support near the same end on which the charge is placed. Passage of gas carries the fine particles away while the larger particles remain behind. The spherules which are obtained are about 100–200 microns in diameter. They are preferably stored in an inert atmosphere such as dry argon. Spherules thus obtained can be metal plated to provide a useful coating. Thus, for example, a quantity of $UC_2$ spherules are placed in a copper dish which is made the cathode in an electroplating cell. A sheet of copper is used as the anode. The cell is filled with an electrolyte having the following composition:

| | | |
|---|---|---|
| $H_2SO_4$ (conc.) | ml | 37.0 |
| $CuSO_4$ | g | 20.0 |
| Water to make 1 liter. | | |

The anode is located a short distance above the cathode. The spherules in the cathode are continuously agitated with a stream of argon-flowing at a rate of about 2–3 cu. ft./hour. A current of about 0.45 ampere at 1.5 volts is passed for ten minutes. At the end of that time the spherules are found to have a copper coating. This can be increased in thickness by continuing the plating process.

Example 11

This example illustrates the formation of uranium (thiorium) carbide spherules of the invention.

A mixture of 50 parts of —325 mesh thorium oxide, 20 parts of uranium oxide similar to that employed in Example 8 and 7 parts of furnace black ("Thermax") are milled in a ball mill having alumina balls with 230 parts of water containing 0.5 part of "Tergitol TMN" alkyl ether of polyethylene glycol, a surfactant, and 2.0 parts of polyvinyl alcohol as a binder to produce a creamy magma which is cast into a dish and dried at 75° C. in an oven for 24 hours to give a friable cake. (*This provides about 2.3 mols of carbon per mol of uranium and thorium oxides.*) The cake is ground to a powder in a mortar and pestle and screened through a 100 mesh screen to give a fine powdery material. This procedure is employed to obtain a mixture as homogeneous as possible since it is desired that the spherules made each have the same composition. The powdery material is formed into pellets by pressing at 23,000 p.s.i. and is again pulverized in a mortar and pestle and screened and classified into particle sizes of 150 to 300 microns.

One part of the 150 to 300 microns size granules is combined and blended with 2 parts of carbon (thermatomic) for 30 minutes in V blender. The entire mixture (*comprising the 150 to 300 micron size particles in a bed of carbon powder*) is placed in a graphite boat in a carbon tube furnace as described above and fired in a flowing argon atmosphere. Heating up to 2550° C. requires ¼ hour and a temperature of about 2550° to 2580° C. is then maintained for 30 minutes *whereby the uranium (thorium) oxides are carburized to produce the corresponding dicarbides and the dicarbide particles are melted sufficiently to spheroidize them.* The boat is *then* removed to the cool end of the furnace and allowed to cool, maintaining the stream of argon for one hour. The carbon including the spherules of uranium (thorium) carbide is suspended in dry isooctane and agitated in an ultrasonic cleaner for about three minutes. The spherules settle immediately the agitation stops and the thick carbon suspension is decanted. This process is repeated about 3 times until the supernatant liquid is clear. The resultant uranium (thorium) carbide spherules, in which the ratio of thorium to uranium is about 5 to 2 (approximate formula $U_{0.3}Th_{0.7}C_2$), are further classified to remove a few irregular particles and screened. They are substantially spherical particles of about 100 to 200 micron diameter.

The spherules are coated with pyrocarbon in the apparatus and by the procedure described in Example 9 for uranium carbide spherules. The spherules are thus heated in argon containing 90 percent by volume of methane for 2 hours, *to provide a pyrocarbon coating on the spherules.* The resultant spherules have a 60 micron thick coating of pyrocarbon. They are suitable for use in graphite matrix fuel elements.

By repeating the above procedure employing various proportions of thiorium oxide, spherules are formed having any desired ratio of thorium to uranium. When uranium is omitted the spherules formed are of thorium carbide. Thus, for example, by repeating the above procedure using 1 part of thiorium dioxide and nine parts of uranium dioxide, *a dicarbide of* the approximate formula of the resulting material is $U_{0.9}Th_{0.1}C_2$ and when 9 parts of thorium dioxide and 2 parts of uranium dioxide are used, the approximate formula is $U_{0.18}Th_{0.82}C_2$. As the proportion of thorium increases the temperature of firing is increased so that in the absence of uranium a temperature at least above about 2655° C., the reported melting point of $ThC_2$, and ranging up to about 2900° C., is employed. Thus, by repeating the procedure set forth hereinabove, but using 70 parts of −325 mesh thorium oxide, there is produced spherular thorium dicarbide of 150–300 microns diameter. This may also be coated with pyrocarbon if desired.

What is claimed is:

1. The method for producing solid spherules of a crystalline material of the class consisting of uranium carbide, thorium carbide and uranium (thorium) carbide which comprises the transformation to spherical shape of small irregularly shaped discrete particles of a material of the group consisting of uranium, thorium, uranium carbide, uranium (thorium) carbide and compounds of uranium and thorium which react with carbon on heating to form uranium carbide, thorium carbide and uranium (thorium) carbide, said discrete particles being isolated from one another by an isolating medium characterized by low bulk density, resiliency, lack of undesirable reactivity and, when said small irregularly shaped particles are other than a carbide, by the presence of at least a sufficient amount of carbon to produce the corresponding carbide in addition to the isolating medium, by subjecting said particles and their matrix of isolating medium to rapid heating in a non-reactive atmosphere for a sufficient time and at a sufficient intensity to effect fusion of the discrete small particles in the isolating medium thereby subjecting said discrete particles to the action of surface tension forces inherent in said particles and rendering them substantially spherical, cooling the resultant discrete spherular particles and their matrix of isolating medium and separating said discrete spherular particles from said isolating medium.

2. The method for producing crystalline carbide spherules which comprises isolating small irregularly shaped particles of a member of the group consisting of uranium carbide, thorium carbide and uranium (thorium) carbide with an isolating medium of the class consisting of boron nitride and carbon, rapidly melting the isolated particles in the said isolating medium and in a non-reactive atmosphere until they are formed into discrete spherules under surface tension, cooling the spherules, and separating the spherules from the isolating medium.

3. The method for producing spherules of crystalline uranium carbide, which comprises isolating particles of a uranium-containing starting material which yields uranium carbide upon heating with carbon with an isolating medium of low bulk density of the group consisting of carbon and boron nitride containing carbon in amount at least sufficient to react with the starting material to form uranium carbide in addition to the isolating medium when a starting material other than uranium carbide is used, rapidly heating the said particles and isolating medium in a non-reactive atmosphere to melt them and to form spherules of uranium carbide by the action of surface tension forces inherent in said particles, cooling the spherules, and separating the spherules from the isolating medium.

4. The method for producing spherules of crystalline uranium (thorium) carbide, which comprises isolating particles of a uranium and thorium-containing starting material which yields uranium (thorium) carbide upon heating with carbon with an isolating medium of low bulk density of the group consisting of carbon and boron nitride containing carbon in amount at least sufficient to react with the starting material to form uranium carbide in addition to the isolating medium when a starting material other than uranium (thorium) carbide is used, rapidly heating the said particles and isolating medium in a non-reactive atmosphere to melt them and to form spherules of uranium (thorium) carbide by the action of surface tension forces inherent in said particles, cooling the spherules, and separating the spherules from the isolating medium.

5. In the method for producing crystalline carbide spherules, the step which comprises maintaining discrete small particles of a member of the group consisting of crystalline uranium carbide, crystalline thorium carbide and crystalline uranium (thorium) carbide, in admixture with an isolating medium comprising a member of the group consisting of boron nitride and carbon, in molten form in a non-reactive atmosphere for a period of time just sufficient to form carbide spherules by operation of surface tension on the molten particles and cooling the molten particles to a temperature below their melting point.

6. In the method for producing spherules of crystalline uranium carbide, the step which comprises maintaining discrete, finely divided particles of uranium carbide, in admixture with a low bulk density isolating medium of the class consisting of boron nitride and carbon, in molten form in a non-reactive atmosphere for a period of time just sufficient to form spherules of uranium carbide by operation of surface tension on the molten particles and cooling the said spherules to a temperature below their melting point.

7. In the method for producing spherules of crystalline uranium (thorium) carbide, the step which comprises maintaining discrete, finely divided particles of uranium (thorium) carbide, in admixture with a low bulk density isolating medium of the class consisting of boron nitride and carbon, in molten form in a non-reactive atmosphere for a period of time just sufficient to form spherules of uranium (thorium) carbide by operation of surface tension on the molten particles and cooling the said spherules to a temperature below their melting point.

8. A method of making crystalline uranium carbide spherules, which comprises isolating 1 part by weight of irregular particles of uranium carbide in admixture with finely divided low bulk density carbon in amount of about 1 to 100 parts by weight, melting the said irregular particles in a non-reactive atmosphere for a period of time just sufficient to bring about formation of uranium carbide spherules; cooling the spherules, and separating the uranium carbide spherules from the carbon.

9. A method of making crystalline uranium (thorium) carbide spherules, which comprises isolating 1 part by weight of irregular particles of uranium (thorium) carbide in admixture with finely divided low bulk density carbon in amount of about 1 to 100 parts by weight, melting the said irregular particles in a non-reactive atmosphere for a period of time just sufficient to bring about formation of uranium (thorium) carbide spherules; cooling the spherules, and separating the uranium (thorium) carbide spherules from the carbon.

10. The method for producing crystalline carbide spherules which comprises melting small discrete irregular particles of a material of the class consisting of uranium, thorium, uranium carbide, thorium carbide, uranium (thorium) carbide and compounds of thorium and of uranium which react with carbon on heating to form thorium carbide, uranium carbide and uranium (thorium) carbide, in contact with a finely divided solid isolating medium, the said isolating medium consisting essentially of carbon when the said particles are other than a carbide, in a non-reactive atmosphere, to form spherules of the selected carbide under the influence of surface tension forces inherent in molten particles; and cooling the said spherules to a temperature below their melting point to solidify the said carbide in spherical form.

11. The method for producing crystalline carbide spherules of the class consisting of uranium carbide, thorium carbide and uranium (thorium) carbide which comprises transforming to liquid spherules small discrete irregularly shaped particles of a material of the class consisting of uranium, thorium, thorium carbide, uranium carbide, uranium (thorium) carbide and compounds of uranium and of thorium which react with carbon on heating to form uranium carbide, thorium carbide and uranium (thorium) carbide by rapidly heating the said particles in a non-reactive atmosphere, and in contact with a finely divided solid isolating medium, the said isolating medium consisting essentially of carbon when the said particles are other than a carbide, cooling the spherules to solidify them, and separating the solid spherules from the isolating materials.

12. The method for producing crystalline spherules of the class consisting of uranium carbide, thorium carbide and uranium (thorium) carbide, which comprises forming molten isolated substantially spherical particles of the selected carbide under the operation of surface tension forces inherent in said molten particles in contact with a finely divided solid isolating medium and in an inert atmosphere, substantially immediately cooling the spherules thus formed, and separating the spherules from the isolating materials.

13. The method for producing spherules of a member of the group consisting of crystalline uranium carbide, crystalline thorium carbide and crystalline uranium (thorium) carbide, which comprises mixing a material of the group consisting of uranium, thorium, uranium carbide, thorium carbide, uranium (thorium) carbide, and compounds of uranium and of thorium which react on heating to form uranium carbide, thorium carbide and uranium (thorium) carbide, with a finely divided isolating medium of the group consisting of boron nitride and carbon, the said isolating medium containing at least enough carbon to produce the corresponding carbide when a material other than a carbide is present, heating the mixture in a non-reactive atmosphere for a period of time sufficient to form crystalline carbide spherules under the operation of surface tension forces inherent in molten particles, cooling the mixture, and separating the carbide spherules from the remainder of the mixture.

*14. A method of preparing dense, spheroidized, unagglomerated nuclear fuel carbide particles, which method comprises the steps of mixing together particulate nuclear fuel oxide, particulate carbon in a concentration sufficient to form carbide with substantially all of said nuclear fuel, and carbonizable binder, making a magma of said mixture in a solvent for said binder, drying said magma and particulating said mixture, uniformly dispersing the resultant fuel particles of from about 300 to 500 micron size in a concentration of finely divided graphite sufficient to maintain said fuel particles out of physical contact with each other in said bed, disposing said dispersion in a reaction zone and heating said fuel particles in said zone in a non-reactive atmosphere to carburizing temperature for said nuclear fuel, maintaining said fuel particles at said temperature until carburization is substantially completed and thereafter increasing the temperatures of said particles to above the melting point of the nuclear fuel carbides formed in situ in said fuel particles, maintaining said fuel particles at said temperature until substantially all of said particles have melted and have spheroidized, thereafter cooling said particles to solidify the same, and separating said solidified particles from non-adhering graphite, whereby dense, hard, spheroidized, unagglomerated nuclear fuel carbide particles are provided.*

*15. The method of claim 14 wherein said nuclear fuel oxide comprises uranium oxide.*

*16. The method of claim 14 wherein said nuclear fuel oxide comprises thorium oxide.*

*17. The method of claim 15 wherein said nuclear fuel oxide also includes thorium oxide, and wherein said binder comprises an organic binder.*

*18. A method of preparing dense, spheroidized, unagglomerated nuclear fuel carbide particles, which method comprises the steps of mixing together particulate nuclear fuel material and carbonizable binder, said nuclear fuel containing a metal from the class consisting of uranium and thorium, the mixture containing an amount of carbon at least equivalent to the amount of nuclear fuel metal in said nuclear fuel, particulating said mixture and uniformly dispersing the resultant fuel particles of from about 10 micron to 125 mil size in finely divided graphite so as to maintain said fuel particles out of physical contact with each other in said graphite, disposing said dispersion in a reaction zone and heating said fuel particles in said zone in a substantially oxygen-free environment to above the melting point of the nuclear fuel carbides of said fuel particles, maintaining said particles at said temperature until substantially all of said particles have melted and have spheroidized, and thereafter cooling said particles to solidify the same, whereby dense, hard, spheroidized, unagglomerated nuclear fuel carbide particles are provided.*

*19. The method for producing solid spherules of a crystalline metallic nuclear fuel carbide which comprises the transformation to spherical shape of small irregularly shaped discrete particles of a carbide-forming material containing the metal of the nuclear fuel carbide to be formed, said discrete particles being isolated from one another by an isolating medium characterized by low bulk density, resiliency, lack of undesirable reactivity and, when said small irregularly shaped particles are other than a carbide, by the presence of at least a sufficient amount of carbon to produce the corresponding carbide in addition to the isolating medium, by subjecting said particles and their matrix of isolating medium to rapid heating in a non-reactive atmosphere for a sufficient time and at a sufficient intensity to effect formation of the carbide by reaction with carbon when the particles are other than a carbide and to bring about fusion of the discrete small particles in the isolating medium thereby subjecting said discrete particles to the action of surface tension forces*

*inherent in said particles and rendering them substantially spherical, and cooling the resultant discrete spherular particles to solidify them.*

*20. The method of fabricating a nuclear fuel metal carbide particle which comprises mixing together a carbide-forming material containing the metal of the desired nuclear fuel carbide, organic binder and an amount of carbon for reaction with said carbide-forming material in addition to the carbon present in said organic binder and the carbon to be used as the isolating bed, converting said mixture into particles and dispersing said particles in a bed of finely divided carbon, heating in said bed to above the carburizing temperature of said particles, and subsequently heating said particles in said bed to above the melting point thereof so as to spheroidize the same, cooling said particles to below the melting point thereof, separating said particles from said carbon bed and heating said particles in a gaseous hydrocarbon atmosphere above the pyrolytic decomposition temperature for said hydrocarbon to form a tough, hard protective adherent outer coating of pyrolytic carbon about said particle.*

*21. The method for producing solid spherules of a crystalline material of the class consisting of uranium carbide, thorium carbide and uranium (thorium) carbide which comprises the transformation to spherical shape of small irregularly shaped discrete particles of a material of the group consisting of uranium, throium, uranium carbide, uranium (thorium) carbide and compounds of uranium and thorium which react with carbon on heating to form uranium carbide, thorium carbide and uranium (thorium) carbide, said discrete particles being isolated from one another by an isolating medium characterized by low bulk density, resiliency, lack of undesirable reactivity and, when said small irregularly shaped particles are other than a carbide, by the presence of at least a sufficient amount of carbon to produce the corresponding carbide in addition to the isolating medium, by subjecting said particles and their matrix of isolating medium to heating in a non-reactive atmosphere for a sufficient time and at a sufficient intensity to effect fusion of the discrete small particles in the isolating medium thereby subjecting said discrete particles to the action of surface tension forces inherent in said particles and rendering them substantially spherical, cooling the resultant discrete spherular particles and their matrix of isolating medium, separating said discrete spherular particles from said isolating medium, and heating said particles in a gaseous hydrocarbon atmosphere to above the pyrolytic decomposition temperature for said hydrocarbon to form a protective adherent outer coating of pyrolytic carbon about said particles.*

*22. The method for producing solid spherules of a crystalline metallic nuclear fuel carbide which comprises the transformation to spherical shape of small irregularly shaped discrete particles of a carbide-forming material containing the metal of the nuclear fuel carbide to be formed said discrete particles being isolated from one another by an isolating medium characterized by low bulk density, resiliency, lack of undesirable reactivity and, when said irregularly shaped particles are other than a carbide, by the presence of at least a sufficient amount of carbon to produce the corresponding carbide in addition to the isolating medium, by subjecting said particles and their matrix of isolating medium to heating in a non-reactive atmosphere for a sufficient time and at a sufficient intensity to effect formation of the carbide by reaction with carbon when the particles are other than a carbide and to bring about fusion of the discrete small particles in the isolating medium thereby subjecting said discrete particles to the action of surface tension forces inherent in said particles and rendering them substantially spherical, cooling the resultant discrete spherular particles to solidify them, and heating said particles in a gaseous hydrocarbon atmosphere to above the pyroltic decomposition temperature for said hydrocarbon to form a protective adherent outer coating of pyrolytic carbon about said particles.*

*23. The method of fabricating a nuclear fuel metal carbide particle which comprises mixing together a carbide-forming material containing metal of the nuclear fuel carbide to be formed, carbonizable binder and about 2 to 4 mols of carbon per mol of said carbide-forming material, converting said mixture into particles and dispersing said particles in a bed of finely divided carbon, heating in said bed to above the carburizing temperature of said particles, and continuing heating said particles in said bed to above the melting point thereof so as to spheroidize the same, cooling said particles to below the melting point thereof, separating said particles from said carbon bed and heating said particles in a gaseous hydrocarbon atmosphere above the pyrolytic decomposition temperature for said hydrocarbon to form a protective adherent outer coating of pyrolytic carbon about said particles.*

*24. A method of preparing dense, spheroidized unagglomerated nuclear fuel carbide particles, which method comprises the steps of mixing together material including particulate nuclear fuel and carbonizable binder, the mixture containing an amount of carbon at least equivalent to the amount of nuclear fuel metal in said nuclear fuel, particulating said mixture and uniformly dispersing the resultant particles of from about 300–500 micron size in a sufficient amount of finely divided graphite so as to maintain said fuel particles out of physical contact with each other in said graphite, disposing said dispersion in a reaction zone, and heating said fuel particles in said zone in a non-reactive atmosphere to above the melting point of nuclear fuel carbides, maintaining said fuel particles at said temperature until said fuel particles have melted and have spheroidized, and thereafter cooling said fuel particles to solidify the same, whereby dense, hard, spheroidized, unagglomerized nuclear fuel carbide particles are provided.*

*25. The method of fabricating spherules of a crystalline material of the class consisting of uranium carbide, thorium carbide and uranium (thorium) carbide which comprises mixing together oxide of uranium, thorium or uranium and thorium, carbonizable binder, and about 2 to 4 mols of carbon per mol of said oxide, converting said mixture into particles and dispersing said particles in a bed of finely divided carbon, heating in said bed to above the carburizing temperature of said particles, and continuing heating said particles in said bed to above the melting point thereof so as to spheroidize the same, cooling said particles to below the melting point thereof, separating said particles from said carbon bed and heating said particles in a gaseous hydrocarbon atmosphere above the pyrolytic decomposition temperature for said hydrocarbon to form a protective adherent outer coating of pyrolytic carbon about said particles.*

*26. The method of claim 1 wherein the irregularly shaped discrete particles are oxides and there is at least sufficient carbon in addition to the isolating medium to produce the corresponding carbide.*

*27. The method for producing solid spherules of a crystalline metallic nuclear fuel carbide which comprises the transformation to spherical shape of small irregularly shaped discrete particles of a carbide-forming material containing the metal of the nuclear fuel carbide to be formed, said metal being selected from the class consisting of uranium and thorium, said discrete particles being within such a size range as to produce spherular particles of diameters from 10 microns to 125 mils, and being isolated from one another by an isolating medium characterized by low bulk density, resiliency and lack of undesirable reactivity and, when said irregularly shaped particles are other than a carbide, including at least a sufficient amount of carbon to produce the corresponding carbide in addition to the isolating medium, by subjecting said particles and their matrix of isolating meduim under conditions which avoid formation of a critical mass to heating in a nonreactive atmosphere to a temperature in the range of*

*about 2300 to 2700° C. for a sufficient time and at a sufficient intensity to effect formation of the carbide by reaction with carbon when the particles are other than a carbide and to bring about fusion of the discrete small particles in the isolating medium thereby subjecting said discrete particles to the action of surface tension forces inherent in said particles and rendering them substantially spherical, cooling the resultant discrete spherular particles to solidify them, and heating said particles in a gaseous hydrocarbon atmosphere to above the pyrolytic decomposition temperature for said hydrocarbon to form a protective adherent outer coating of pyrolytic carbon about said particles.*

References Cited

The following references, cited by the Examiner, are of record in the patented file of this patent or the original patent.

UNITED STATES PATENTS

| | | | |
|---|---|---|---|
| 2,461,011 | 2/1949 | Taylor | 18—47.1 |
| 2,510,574 | 6/1950 | Grunhalgh | 18—47.2 |
| 2,728,107 | 12/1955 | Hershey | 18—47.2 |
| 2,872,307 | 2/1959 | Wilhelm et al. | 15—122.7 |

OTHER REFERENCES

AEC Report ORNL-1633, December 1953, p. 1.

Progress in Nuclear Energy, vol. 5, 1956, pp. 435–436.

AEC Report KAPL-M-ATM-1, November 1958, pp. 1–7.

AEC Report BMI-1357, June 1959, pp. 12, 52 and 53.

REUBEN EPSTEIN, Primary Examiner

U.S. Cl. X.R.

252—301; 14—89; 23—349; 214—15

UNITED STATES PATENT OFFICE
CERTIFICATE OF CORRECTION

Patent No. Reissue 27,264 Dated January 11, 1972

Inventor(s) Harold G. Sowman and James R. Johnson

It is certified that error appears in the above-identified patent and that said Letters Patent are hereby corrected as shown below:

Column 3, line 12, "preferably" should read --Preferably-- .
Column 5, line 2, "present" should read --presents-- .
Column 6, line 50, "scope" should read --slope-- .
Column 7, line 55, "bright" should be in italics.
Column 13, line 32, "thiorium" should read --thorium-- .
Column 17, line 27, "throium" should read --thorium-- .

Signed and sealed this 22nd day of August 1972.

(SEAL)
Attest:

EDWARD M.FLETCHER,JR.
Attesting Officer

ROBERT GOTTSCHALK
Commissioner of Patents

USCOMM-DC 60376-P69
☆ U.S. GOVERNMENT PRINTING OFFICE : 1969 O—366-334

Dedication

Reissue No. 27,264.—*Harold G. Sowman*, Maplewood, and *James R. Johnson*, White Bear Lake, Minn. METHOD OF MAKING SPHERULES OF A CRYSTALLINE NUCLEAR FUEL CARBIDE. Patent dated Jan. 12, 1972. Dedication filed May 8, 1973, by the assignee, *the United States of America.*

Hereby dedicates to the Public of the United States the portion of the term of the patent subsequent to Feb. 12, 1973.

[*Official Gazette November 27, 1973.*]